United States Patent [19]

Yamanaka et al.

[11] 4,337,794

[45] Jul. 6, 1982

[54] SOLENOID VALVE ASSEMBLY

[75] Inventors: Minoru Yamanaka; Hideo Haneda, both of Toyota; Masatoshi Kato, Kariya; Mitsuyuki Suzuki, Gamagori, all of Japan

[73] Assignee: Aisin Seiki Kabushiki Kaisha, Kariya, Japan

[21] Appl. No.: 151,591

[22] Filed: May 20, 1980

[30] Foreign Application Priority Data

Jun. 26, 1979 [JP] Japan ............................ 54-087274[U]

[51] Int. Cl.$^3$ ............................................ F15B 13/044
[52] U.S. Cl. ................................ 137/596.17; 137/881; 251/139
[58] Field of Search .................... 137/596.17, 881; 251/137, 139

[56] References Cited

U.S. PATENT DOCUMENTS

| | | | |
|---|---|---|---|
| 2,561,922 | 7/1951 | Hall | 251/139 |
| 3,565,111 | 2/1971 | Pearson | 137/596.17 |
| 3,842,860 | 10/1974 | Stampfli | 137/596.17 |
| 4,258,749 | 3/1981 | Mayer | 137/881 X |

FOREIGN PATENT DOCUMENTS

| | | | |
|---|---|---|---|
| 1157868 | 11/1963 | Fed. Rep. of Germany | 137/596.17 |
| 2410767 | 9/1975 | Fed. Rep. of Germany | 251/139 |
| 2603838 | 8/1977 | Fed. Rep. of Germany | 251/137 |
| 1315493 | 5/1973 | United Kingdom | 251/139 |

*Primary Examiner*—Gerald A. Michalsky
*Attorney, Agent, or Firm*—Oblon, Fisher, Spivak, McClelland & Maier

[57] ABSTRACT

A solenoid valve assembly having two bobbins including the solenoids which are co-axially supported by a housing first and second valve bodies slidably supported in each axial bore of the two bobbins and movable independently with respect to energized conditions of the solenoids, an outlet port formed in the housing to receive control pressure from two different pressure sources applied to two inlet ports formed in the housing, a first, second, third and fourth valve core positioned within the housing, a single sleeve of non-magnetic material secured to the valve cores such that the valve cores are positioned within axial bores of the bobbins, passageways for communicating with the outlet and two inlet ports formed in the sleeve and valve cores, the first valve body being of a magnetic material which is axially movable and supported in the sleeve between the first valve core and the second valve core, the second valve body including magnetic material axially movable and supported in the sleeve between the third valve core and the fourth valve core and a member for biasing the valve bodies, respectively, in an axial direction.

4 Claims, 1 Drawing Figure

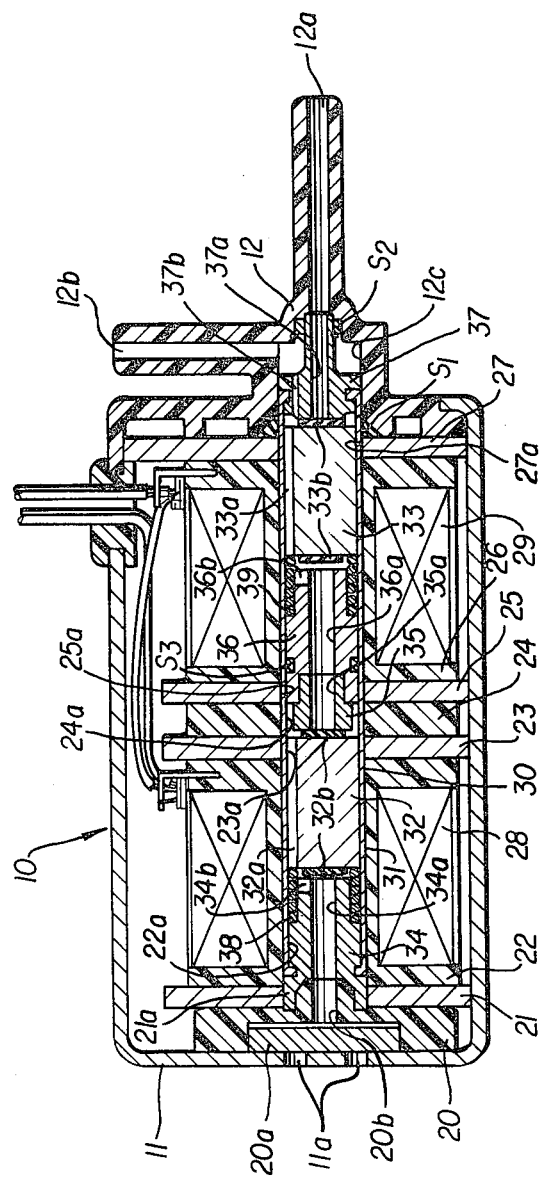

SOLENOID VALVE ASSEMBLY

BACKGROUND OF THE INVENTION

1. Field of the Invention

The present invention relates to a solenoid valve assembly and, more particularly, to an improvement in the type of electrical operated two valve members which are moved independently.

2. Description of Prior Art

The conventional solenoid valve assembly is disclosed for example in British Pat. No. 1428741 published on Mar. 17, 1976. Such conventional solenoid valve assembly includes two tube members on non-magnetic material surrounded respectively by two solenoids having respective valve members slidably supported therein and a lateral magnet disc secured to the two tube members at both sides thereof and extended to the outer circumference of tube members.

In the above valve arrangement, testing of the valve function of the valve assembly before installing solenoids therein is impossible because the lateral magnet disc extending to outer circumference of tube members can not be inserted into a center opening of the solenoid assembly substantially equal to the diameter of the tube members, and magnetic shielding between the two valve members can not be assured such that the valve members may be erroneously moved.

SUMMARY OF THE INVENTION

An object of the present invention is therefore to provide a solenoid valve assembly having two electrically operated valve members which overcomes the above-noted disadvantages in the conventional solenoid valve assembly.

Another object of the present invention is to provide an improved solenoid valve assembly which is low in cost and simple in construction.

According to the present invention, the valve assembly includes a single sleeve of non-magnetic material, two valve cores of magnetic material and two valve cores of non-magnetic material, passageways formed in the sleeve and the valve cores, and two valve bodies of magnetic material for valving the passageways which are slidably supported between the valve cores.

BRIEF DESCRIPTION OF THE DRAWINGS

Various other objects, features and attendant advantages of the present invention will be more fully appreciated as the same becomes better understood from the following detailed description when considered in connection with the accompanying drawings and wherein:

The sole FIGURE is a cross-sectional view showing one embodiment of solenoid valve assembly according to the present invention.

DETAILED DESCRIPTION OF THE PREFERRED EMBODIMENTS

A housing 10 includes a yoke 11 of magnetic material and a cover 12 of synthetic resin. An air filter cover 20, a plate 21 of magnetic material, a bobbin 22, a first plate 23 of magnetic material, a magnetic shielding plate 24, a second plate 25 of magnetic material, a bobbin 26 and a third plate 27 of magnetic material are coaxially fixed to the housing 10 in this order as shown in the sole FIGURE.

The yoke 11 has a first inlet port 11a which is in communication with atmosphere. The cover 12 has a second inlet port 12a which is in communication with a vacuum reservoir (not shown) and an outlet port 12b which is in communication with a servo chamber of an actuator (not shown).

The air filter cover 20 of synthetic resin has a filter 20a disposed therein. A solenoid coil 28 is wound on the bobbin 22, and a solenoid coil 29 is wound on the bobbin 26. The solenoid coils 28 and 29 are independently energized by an electrical signal.

The plate 21, bobbin 22, plate 23, plate 24, plate 25, bobbin 26, plate 27 and cover 12 have respective holes or axial bores 21a, 22a, 23a, 24a, 25a, 26a, 27a and 12c formed therein of equal diameter. A valve assembly 30 is inserted and mounted in the holes 21a, 22a, 23a, 24a, 25a, 26a, 27a and 12c through seals $S_1$ and $S_2$ by the air filter cover 20 and the cover 12.

The valve assembly 30 includes a single or sole sleeve 31 of non-magnetic material, two valve bodies 32 and 33 and four valve cores 34, 35, 36 and 37. The first valve core 34, the third valve core 36, which is secured to the second valve core 35 and has a seal $S_3$, and the fourth valve core 37 are secured to the sleeve 31 by calking as shown in the sole FIGURE to thereby form a part of a valve passageway.

An outer circumferential slot 32a of the first valve body 32 provides fluid communication between both sides of the valve body 32, and the first valve body 32 having valve members 32b at both ends thereof is slideably movable in an axial direction between the first valve core 34 and the second valve core 35 and is biased to the right by a first spring 38.

An outer circumferential slot 33a of the second valve body 33 provides fluid communication between both sides of the body 33, and the second valve body 33 having valve members 33b at both ends thereof is slideably movable in an axial direction between the third valve core 36 and the fourth valve core 37 and is biased to the right by a second spring 39.

The first valve core 34 of magnetic material has a valve port 34a in communication with the first inlet port 11a through the filter 20a and a hole 20b of air filter cover 20 at the axial center thereof and has an opening 34b, at the right side end thereof, which provides communication between the valve port 34a and the slot 32a. A valve port 35a is formed at axial center portion of second valve core 35 of non-magnetic material such as brass and is controlled by the valve body 32.

The third valve core 36 of magnetic material has a valve port 36a in communication with the valve port 35a and has an opening 36b which provides communication between the valve port 36a and the slot 33a. The fourth valve core 37 of non-magnetic material such as brass has a valve port 37a in communication with second inlet port 12a at the axial center thereof and has a passageway 37b which provides communication between the slot 33a and the outlet port 12b. Communication between the valve port 37a and the outlet port 37b is controlled by the valve body 33.

In operation, when both solenoids 28 and 29 are energized, both valve bodies 32 and 33 are correspondingly moved to the left within the sleeve 31 against the biasing force of springs 38 and 39, respectively, so that the valve member 32b and the valve member 33b are respectively spaced from the second valve core 35 and the fourth valve core 37, whereby the first inlet port 11a which continuously is under atmospheric pressure is brought into communication with outlet port 12b through air filter 20a, hole 20b of air filter cover 20, valve port 34a and opening 34b of first valve core 34, slot 32a of first valve body, valve port 35a of second valve core 35, valve port 36a and opening 36b of third valve core 36, slot 33a of second valve body 33 and passageway 37b of fourth valve core 37, and the second inlet port 12a which is continuously under vacuum pressure is brought into communication with the outlet port 12b through the valve port 37a and passageway 37b of fourth valve core 37. Therefore, the outlet port 12b now receives a vacuum pressure of intermediate value between the vacuum of second inlet port 12a and atmosphere.

Under the above-noted condition, when the solenoid 29 is deenergized, the second valve body 33 is moved to the right in the sleeve 31 by the biasing force of spring 39 so that valve member 33b cuts off the valve port 37a. Therefore, the outlet port 12b is cut off from the second inlet port 12a and now is under atmospheric pressure.

Therefore, when the solenoid 29 is energized once more and the solenoid 28 is at the same time deenergized, the second valve body 33 is moved to the left in the sleeve 31 and the first valve body 32 is moved to the right in the sleeve 31 at the same time so that valve port 37a is in communication with passageway 37b by second valve body 33, and the valve port 35a is cut off from the slot 32a. Therefore, outlet port 12b is brought into communication with the second inlet port 12a and is cut off from the first inlet port 11a and now receives the vacuum of the second inlet port 12a. In addition, when both solenoids 28 and 29 are deenergized at the same time, the pressure before the deenergized conditions is maintained in the outlet port 12b.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A solenoid valve assembly comprising first and second bobbins including solenoids which are co-axially supported by a housing;
   first and second valve bodies slidably supported in each axial bore of the first and second bobbins and movable independently with respect to energized conditions of said solenoids;
   an outlet port formed in the housing to receive control pressure from two different pressure sources applied to first and second inlet ports formed in the housing;
   a first valve core of magnetic material positioned within said housing;
   a second valve core of non-magnetic material positioned within said housing;
   a third valve core of magnetic material positioned within said housing and secured to said second valve core;
   a fourth valve core of non-magnetic material positioned within said housing;
   a single sleeve of non-magnetic material secured to each of said valve cores wherein said valve cores are positioned within said axial bores of said bobbins;
   means communicating with said outlet and said first and second inlet ports formed in said single sleeve and said valve cores via opposite ends of said single sleeve;
   said first valve body comprising magnetic material axially movable and supported in said single sleeve between said first valve core and said second valve core wherein said first valve body is responsive to operation of said solenoid of said first bobbin independent of said solenoid of said second bobbin;
   said second valve body comprising magnetic material axially movable and supported in said single sleeve between said third valve core and said fourth valve core wherein said second valve body is responsive to operation of said solenoid of said second bobbin independent of said solenoid of said first bobbin; and
   means for biasing said valve bodies, respectively, in an axial direction.

2. A solenoid valve assembly as set forth in claim 1, said first and second valve bodies further comprising valve members formed in opposite ends thereof for contacting said valve cores.

3. A solenoid valve assembly as set forth in claims 1 or 2, said means for communicating further comprising passages formed in said valve cores and a circumferential slot formed in each of said first and second valve bodies.

4. A solenoid valve assembly as set forth in claims 1 or 2, said means for biasing comprising:
   a first spring member positioned between said first valve core and said first valve body; and
   a second spring member positioned between said third valve core and said second valve body.

* * * * *

UNITED STATES PATENT AND TRADEMARK OFFICE
CERTIFICATE OF CORRECTION

PATENT NO. : 4,337,794
DATED : July 6, 1982
INVENTOR(S) : Minoru Yamanaka et al

It is certified that error appears in the above—identified patent and that said Letters Patent is hereby corrected as shown below:

On the title page, Foreign Application Priority Data should read

-- (30) Foreign Application Priority Data
    June 26, 1979    Japan    54-87274 (U) --

Signed and Sealed this

Twenty-sixth Day of October 1982

[SEAL]

Attest:

GERALD J. MOSSINGHOFF

Attesting Officer    Commissioner of Patents and Trademarks